United States Patent [19]
Campion

[11] Patent Number: 5,888,587
[45] Date of Patent: Mar. 30, 1999

[54] METHOD OF MANUFACTURING SILICA POWDER AND USE OF SUCH POWDER IN MAKING AN OPTICAL FIBER PREFORM

[75] Inventor: Jean-Florent Campion, Arpajon, France

[73] Assignee: Alcatel N.V., Amsterdam

[21] Appl. No.: 41,871

[22] Filed: Mar. 13, 1998

Related U.S. Application Data

[62] Division of Ser. No. 852,061, May 6, 1997, which is a continuation of Ser. No. 466,185, Jun. 6, 1995, abandoned, which is a continuation of Ser. No. 87,060, Jul. 7, 1993, abandoned.

[30] Foreign Application Priority Data

Jul. 7, 1992 [FR] France .................................. 9208369

[51] Int. Cl.$^6$ ........................................................ B05D 3/06
[52] U.S. Cl. .................. 427/163.2; 427/452; 427/248.1; 427/255
[58] Field of Search ................................. 427/163.2, 452, 427/248.1, 255

[56] References Cited

U.S. PATENT DOCUMENTS

| | | | |
|---|---|---|---|
| 3,954,431 | 5/1976 | Fleming, Jr. et al. | 65/18.1 |
| 4,042,361 | 8/1977 | Bihuniak et al. | 65/18.1 |
| 4,200,445 | 4/1980 | Bihuniak | 65/21.5 |
| 4,402,720 | 9/1983 | Edahiro | 65/397 |
| 4,549,891 | 10/1985 | Plummer | 65/3.12 |
| 4,605,428 | 8/1986 | Johnson et al. | 65/18.1 X |
| 4,689,212 | 8/1987 | Mansfield | 427/452 |
| 4,726,828 | 2/1988 | Clasen | 65/18.1 |
| 4,767,429 | 8/1988 | Fleming et al. | 65/3.11 |
| 4,840,653 | 6/1989 | Rabinovich | 65/312 |
| 4,872,895 | 10/1989 | Fleming | 65/21.5 |
| 4,935,045 | 6/1990 | Yamauchi et al. | 65/3.12 |
| 5,028,247 | 7/1991 | Asami | 65/17.2 |
| 5,063,179 | 11/1991 | Menashi et al. | 501/12 |
| 5,154,745 | 10/1992 | Sergent | 65/3.12 |
| 5,522,007 | 5/1996 | Drouart et al. | 385/141 |
| 5,562,752 | 10/1996 | Fleming | 423/338 |
| 5,643,347 | 7/1997 | Werdecker | 65/17.3 |

FOREIGN PATENT DOCUMENTS

| | | |
|---|---|---|
| 0272281 | 6/1988 | European Pat. Off. . |
| 2103202 | 2/1983 | United Kingdom . |
| 2229715 | 10/1990 | United Kingdom . |

OTHER PUBLICATIONS

Clausen, "Preparation of High–Purity Silica Glass Tubes by Centrifugal Casting of Colloidal Gels", Journal of Materials Science Letters, 7 (1988), 477–478 (no month).

Rabinovich, E.M. et al, "Preparation of High–Silica Glasses from Colloidal Gels . . . Glasses", Journal of the American Ceramic Society, vol. 66, No. 10, Oct. 1983, Columbus US, pp. 683–688.

Database WPIL, Section Ch, Week 05, 1983 Derwent Publications Ltd., London, GB; Class L01, AN 83–10489K for JP–A–57 205 334 (NT&T) 16 Dec. 1982.

Clauden, R., "Preparation and Sintering of High Density Green Bodies to High–Purity Silica Glass", Journal of Non–Crystalline Solids, 89 (1987) 335–344.

*Primary Examiner*—Janyce Bell
*Attorney, Agent, or Firm*—Sughrue, Mion, Zinn, Macpeak & Seas, PLLC

[57] ABSTRACT

A method of applying a silica having fluorine therein by spraying silica simultaneously with a fluorine-containing gas by a POD method plasma torch.

7 Claims, No Drawings

METHOD OF MANUFACTURING SILICA POWDER AND USE OF SUCH POWDER IN MAKING AN OPTICAL FIBER PREFORM

This is a divisional of application Ser. No. 08/852,061 filed May 6, 1997, which is a continuation of application Ser. No. 08/466,185 filed Jun. 6, 1995, now abandoned, which is a continuation of Application Ser. No. 08/087,060 filed Jul. 7, 1993, now abandoned.

The present invention relates to a method of manufacturing a silica powder for use more particularly but not exclusively in making an optical fiber preform.

BACKGROUND OF THE INVENTION

The invention relates essentially to the POD method, i.e. a technique of plasma deposition by spraying and melting a silica powder on a primary preform. That method is described, for example, in the article by Le Sergent et al. entitled "Preform technologies for optical fibers" published in Electrical Communication, Vol. 62, No. 3/4, 1988, page 238.

Until now, the silica powders in use have been of two types.

The first type is a natural quartz powder of satisfactory grain size, but that may present random inclusions that are liable to make the subsequent preform fragile.

The second type is a synthetic powder or soot having a high degree of purity but in which the grains are so small (grain diameter less than 100 nm), that use thereof makes the POD method too lengthy and too expensive. The term "synthetic silica soot" is used below to designate this second type of powder. Such a soot may be obtained, for example, by an MCVD method; it may also be pyrogenic, like the soot sold under the name Aerosil OX-50 and 200 by Degussa.

European patent application EP-A-0271 281 also describes a sol-gel method for making a silica powder for an optical fiber preform. That method consists in dispersing synthetic soot having a specific area of 200 square meters per gram ($m^2/g$) to a concentration of 25% by weight. The resulting gel is fractioned by mechanical means and the resulting grains are dried. It is observed that the grains are extremely friable, thereby making any subsequent screening operation difficult.

OBJECTS AND SUMMARY OF THE INVENTION

An object of the present invention is to avoid that drawback and to propose a sol-gel method that gives rise to silica grains that are not very friable, having grain size and purity that are well suited to the POD method.

The present invention provides a method of manufacturing a silica powder by a sol-gel technique, wherein:

- a suspension of synthetic silica soot having a specific area of less than 80 $m^2fc/g$ is made in water to a concentration of 50% to 75% by weight of silica;
- the said suspension is gelled
- the resulting gel is dried under microwaves;
- the dry gel is broken up into grains of silica of diameter lying in the range 10 $\mu m$ to 1 mm, having an apparent density of about 0.5 $g/cm^3$ to 0.6 $g/cm^3$, and a porosity of less than 20%; and
- screening is performed between 100 $\mu m$ and 500 $\mu m$.

The silica of the gel is transparent to microwaves at the drying temperature. The gel is dried in bulk, without any kind of crust forming. After mechanical separation, the resulting grains are not very fragile and they withstand subsequent screening without breaking up.

In a particular implementation, the gelling is performed by heating said suspension to about 40° C., the resulting gel being dried under a vacuum in a microwave oven, and being broken up by grinding using Teflon balls or by cutting up using a helical screw.

The porous grains obtained by the method of the invention can be used directly in the plasma torch of the POD method.

Preferably, the grains are sprayed simultaneously with a fluorine-containing gas, e.g. of the $SF_6$ type; the flow rate of the gas may be adjusted so that the percentage (by weight) of fluorine incorporated in the silica lies in the range 0.3% to 1.5%.

Various dopants for modifying the refractive index and the mechanical properties of the subsequent preform may be added to the suspension as oxides or soluble salts in powder form; these dopants (titanium, magnesium, calcium, aluminum, barium, strontium, lead, phosphorus) are added individually or in a mixture so as to constitute a fraction by weight that is less than 20%.

In an improved variant implementation, said silica grains are densified in an oven by the following heat treatment:

- temperature rise from 20° C. to 800° C. under oxygen at a rate lying in the range 300° C. per hour to 500° C. per hour; and
- temperature rise from 800° C. to a temperature T lying in the range 1250° C. to 1350° C. under an atmosphere of helium, with an isothermal pause for 1 hour to 5 hours at the temperature T, the density of the silica grains at the end of the heat treatment being about 2.2 $g/cm^3$.

In addition, in order to eliminate OH groups, an intermediate phase at 800° C. may be provided in said heat treatment, with treatment under chlorine or thionyl chloride for a period of time lying in the range 0.5 hours to 2 hours, followed by treatment at around 1000° C. to 1200° C. for about 1 hour under oxygen or a mixture of helium and oxygen for the purpose of eliminating the Cl groups.

During the second stage of the heat treatment, it is also possible to mix a fluorine-containing gas with the helium, .said gas being selected from $SiF_4$, $CCl_2F_2$, HF, $SF_6$, and $NF_3$, so as to incorporate 0.1% to 3% fluorine in said grains The grain densification treatments defined above make it possible to increase their deposition rate on a primary preform using the POD method.

DESCRIPTION OF EXAMPLES

Other characteristics and advantages of the present invention appear from the following description of examples given by way of non-limiting illustration.

EXAMPLE 1

A suspension of 70 kg of silica was made in 30 kg of deionized water. The silica was pyrogenic silica of the Aerosil OX-50 type sold by Degussa having a specific area of 50 $m^2/g$.

The pH of the suspension was 3. It was heated to 40° C. thereby forming a gel which was dried under a vacuum for 8 hours in a microwave enclosure maintained at 70° C. The vacuum was about 100 mm of mercury at the beginning of drying. The microwave power was 8 kwatts at the beginning of drying and it was reduced to 1 kwatt by the end of drying.

A cake was obtained that had been dried very uniformly without any surface crust.

It was broken up by means of a helical screw rotating at a speed lying in the range 10 revolutions per minute (r.p.m.) to 100 r.p.m.

Silica grains were obtained having diameters lying in the range 50 µm to 1 mm, grain size being centered on 300 µm. Density was 0.5 g/cm³.

After screening between 100 µm and 500 µm, grains were obtained representing 70% of the initial silica. The porosity of the grains was about 10%.

The powder was used in a POD method plasma torch at a flow rate lying in the range 370 grams per hour (g/h) to 500 g/h. Spraying was performed on a primary preform having a diameter of 16 mm that was to be increased to 24 mm. Preform growth rate was 0.8 mm per hour and per meter, giving a material yield of 35% to 45%.

EXAMPLE 2

The powder of Example 1 was used and sprayed on a primary preform having a length of 1 meter and a diameter of 18 mm to be increased to 24 mm.

A fluorine-containing gas such as $SF_6$ was also sprayed through the torch, at a rate lying in the range 0.5 liters per minute to 3 liters per minute. At such flow rates, the percentage of fluorine incorporated in the deposited silica lay in the range 0.3% to 1.5%. Deposition speed was 0.70 mm per hour and per meter.

EXAMPLE 3

The powder of Example 1 was used and was subjected to the following densification treatment in an electric oven:

temperature rise from 20° C. to 800° C. under oxygen with temperature rising at 300° C. per hour;

heat treatment under chlorine at 800° C. for 1 hour;

temperature rise from 800° C. to 1350° C. under helium; and pause at 1350° C. for 3 hours.

After such densification, the preform rate of growth as mentioned in Example 1 increased to 3 mm per hour and per meter, with a material yield of 70% to 85%.

EXAMPLE 4

The powder of Example 1 was used and was subjected to the following densification and fluorination treatment in an electric oven:

temperature from 20° C. to 800° C. under oxygen with temperament rising at 300° C./hour;

heat treatment under an atmosphere of helium and $SiF_4$ in the range 800° C. to 1350° C.; and an isothermal pause at 1350° C. for 2 hours.

For 200 grams of silica, the flow rate of $SiF_4$ lay in the range 0.5 liters per hour to 2 liters per hour.

The percentage of incorporated fluorine was 1% by weight for an $SiF_4$ flow rate of 0.5 liters per hour with a helium flow rate of 2 liters per hour.

The above type of powder was used as the refill in a POD method applied to a preform having a length of 1 meter and a diameter of 18 mm that was to be increased to 30 mm. The silica flow rate was 0.4 kg per hour.

The deposition rate was 2.8 mm per hour and per meter. The deposited silica continued to contain 1% by weight of fluorine, corresponding to a refractive index difference $\Delta n = -5 \times 10^{-3}$ relative to pure silica. The material yield lay in the range 65% to 80%.

It should be observed that most advantageously the percentage of fluorine contained in the powder is fully retained in the deposited silica.

Naturally, the invention is not limited to the implementations described above. Without going beyond the ambit of the invention, it is possible to replace any means by equivalent means.

I claim:

1. A method of using a silica powder, comprising spraying the powder on a primary preform by a POD method plasma torch simultaneously with a fluorine-containing gas to produce silica having fluorine incorporated therein, wherein the fluorine incorporated in the silica has a percentage by weight lying in the range of 0.3% to 1.5%;

wherein the powder is manufactured by a method comprising forming a suspension consisting of synthetic silica soot. having a specific surface area of less than 80 m²/g, in water to form a concentration of 50% to 75% by weight of silica;

gelling said suspension;

drying the resulting gel with microwaves and breaking it up into grains of silica having a size lying in the range 10 µm to 1 mm and having an apparent density of about 0.5 g/cm³ to 0.6 g/cm³; and screening the grains of silica to provide grains having a desired size.

2. A method according to claim 1, wherein said gelling step comprises heating said suspension to about 40° C., and wherein said drying step comprises drying the resulting gel under a vacuum in a microwave oven, and wherein said breaking up step comprises grinding said gel using polytetrafluoroethylene balls or cutting up using a helical screw.

3. A method according to claim 1, wherein the resulting gel is dried under microwaves in bulk, without any crust forming.

4. A method according to claim 1, wherein said screening step comprises screening to remove substantially only grains below 100 µm and above 500 µm.

5. A method according to claim 1, wherein said screening step comprises screening to provide grains between 100 µm and 500 µm.

6. A method of using a silica powder, comprising spraying the powder on a primary preform by a POD method plasma torch simultaneously with a fluorine-containing gas to produce silica having fluorine incorporated therein, wherein the fluorine incorporated in the silica has a percentage by weight lying in the range of 0.3% to 1.5%;

wherein the powder is manufactured by a method comprising forming a suspension consisting of synthetic silica soot and at least one dopant compound in water, said suspension having a concentration of 50% to 75% by weight of silica, said silica soot having a specific surface area of less than 80 m²/g, and said at least one dopant compound is an oxide or salt of a dopant material selected from the group consisting of titanium, magnesium, calcium, aluminum, barium, strontium, lead, and phosphorus;

gelling said suspension;

drying the resulting gel with microwaves and breaking it up into grains of silica having a size lying in the range 10 µm to 1 mm and having an apparent density of about 0.5 g/cm³ to 0.6 g/cm³; and screening the grains of silica to provide grains having a desired size.

7. A method according to claim 6, wherein the at least one dopant is added in an amount of less than 20% by weight based on a a total weight of the suspension.

* * * * *